Dec. 28, 1965 F. J. KLANCNIK 3,226,067

BRACKET SUPPORT FOR A UHF TELEVISION ANTENNA

Filed April 14, 1964

INVENTOR.
FRANK J. KLANCNIK

BY Norman Gerlach

ATTORNEY 3,226,067
BRACKET SUPPORT FOR A UHF TELEVISION ANTENNA

Frank J. Klancnik, Chicago, Ill., assignor to Hi-Lo Manufacturing Corp., Chicago, Ill., a corporation of Illinois

Filed Apr. 14, 1964, Ser. No. 359,564
3 Claims. (Cl. 248—43)

The improved bracket support comprising the present invention is designed primarily for use in connection with an antenna conversion kit by means of which the owner of a television receiver whose antenna structure is designed for VHF reception and who has availed himself of facilities for receiving UHF signals may, conveniently and without requiring the services of a television serviceman, install a UHF antenna as an auxiliary adjunct to normal VHF reception.

In some parts of the United States, there are areas which previously had only TV signals from VHF stations but now are being served by one or more UHF stations (channels 14 through 83). For best results, UHF reception by a television receiver requires a different type of antenna structure from that which is required for VHF reception. Practically all present-day television receivers are each factory-equipped with two pairs of antenna lead-in terminals, one pair being for VHF reception and the other pair for UHF reception. Therefore, after a conversion of a television receiver has been made, usually by the installation of a UHF tuner, it is desirable that a UHF antenna structure be connected to the UHF terminals of the receiver. The present invention contemplates the provision of a novel and convenient bracket support for such an antenna structure, the support being easily applicable to the rear or back panel of the associated television receiver without any modification whatsoever of the rear panel or with a minimum of such modification, the operation being well within the skill of the average owner of a television set or receiver.

The provision of such a bracket support being the principal and general object of the invention, it is a further object to provide an antenna bracket support which, after installation on the rear panel of the associated television receiver, is capable of permitting the UHF antenna structure to be selectively adjusted both for height and direction.

Another object of the invention is to provide, in an antenna bracket support of this character, a package-type assembly which includes both the UHF antenna structure and the bracket support and may be assembled at the factory and shipped to the field as a unit that is ready for installation in its entirety on a converted television receiver.

A further object of the invention is to provide an antenna bracket support which, together with its associated antenna structure, may be applied to an existing television receiver either without the aid of a tool or with a minimum of labor involving merely the drilling or punching of a few holes through the rear panel of the receiver.

Another object of the invention is to provide an antenna bracket support which, in the main, is comprised of rod stock sections that are suitably welded together, and together with other conventional television antenna components, result in a structure which may be manufactured or produced economically.

A still further object of the invention is to provide a bracket support which is in the form of flat frame rod stock sections, the frame being of open design and wide expanse so that the rod stock sections of which it is formed are widely distributed with the result that there will be no internal capacitance shielding of the electronic circuits that are associated with the television receiver to which the bracket support is applied.

Other objects and advantages of the invention not at this time enumerated will readily suggest themselves as the following description ensues.

In the accompanying single sheet of drawings forming a part of this specification, one illustrative embodiment of the invention has been shown.

Figures 1, 2, 3, 4, 5:
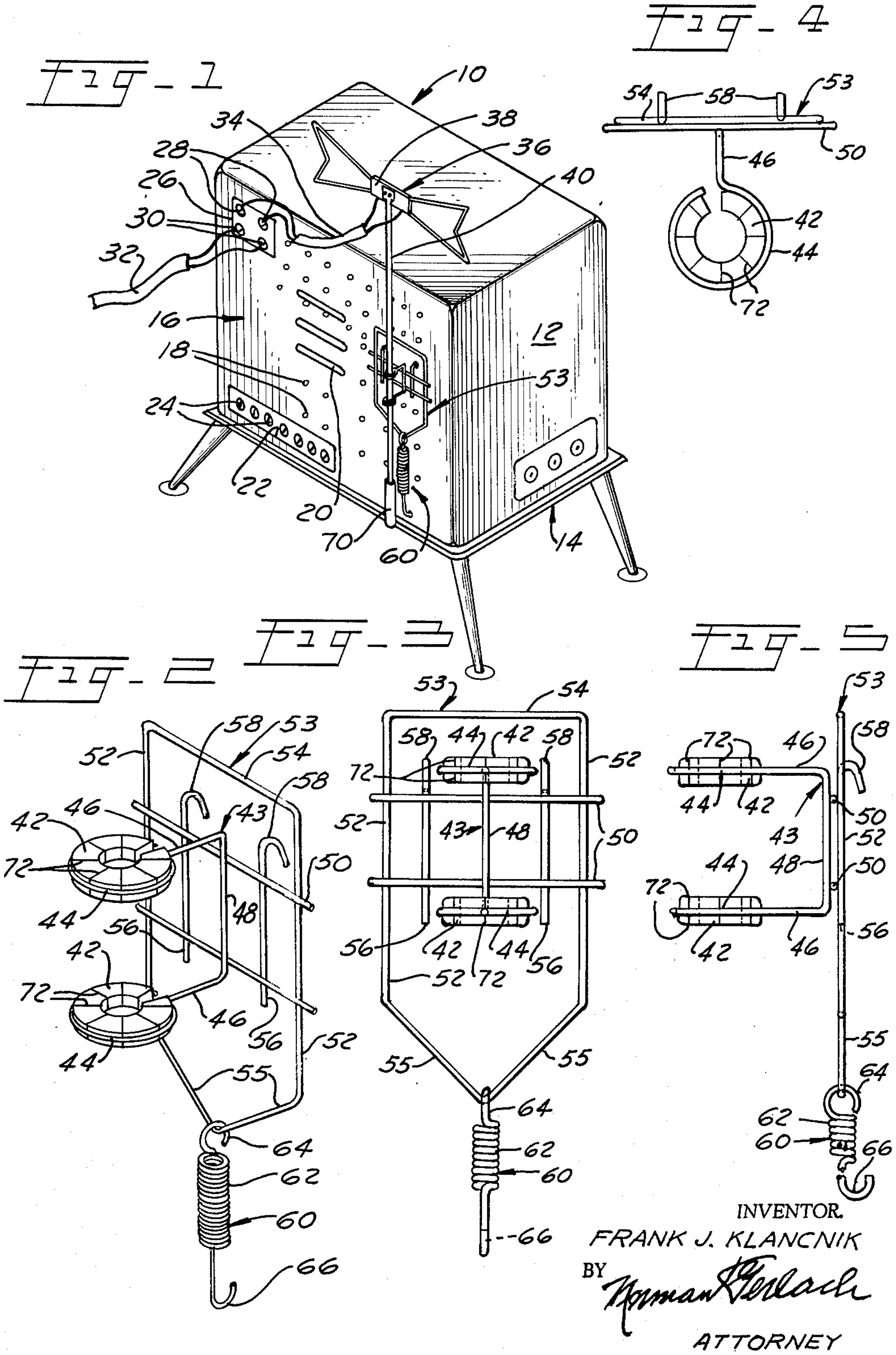
FIG. 1 is a rear perspective view of a television receiver showing an antenna bracket support embodying the invention operatively applied thereto.
FIG. 2 is an enlarged front perspective view showing the bracket support without the antenna and antenna mast.
FIGS. 3, 4 and 5 are, respectively, a front view, a top plan view, and a side elevational view of the improved bracket support.

Referring now to the drawing in detail, and in particular to FIG. 1, a conventional television receiver is illustrated therein and is designated in its entirety by the reference numeral 10. The receiver includes the usual box-like housing 12 which is shown as being supported upon a suitable stand 14. The housing 12 of the receiver is provided with a removable rear panel 16 which is of the perforated hardboard type and has formed therein a checkerboard series of holes 18. Air vent slots 20 and a relief slot 22 for exposure of certain controls 24 are also formed in the rear panel 16. The latter constitutes a convenient mounting means for the antenna bracket support of the present invention and the particular panel that is illustrated in FIG. 1 is purely exemplary. The removable rear panels of television receivers vary widely in their details and, whether they be formed of perforated hardboard or otherwise, they usually are formed with various holes, vent slots, access openings and the like, one or more of which may be employed for anchoring purposes in the application or mounting of the present bracket support as will be described in greater detail presently.

A small rectangular dielectric panel 26 is secured to the rear panel 16 and carries a pair of UHF binding posts 28 and a pair of VHF binding posts 30. The posts 30 are shown as having operatively applied thereto the terminal ends of a VHF transmission cable 32, while the posts 28 are shown as having operatively applied thereto the terminal ends of a UHF transmission cable 34, the opposite ends of such cable being operatively connected to a UHF bow-tie antenna unit 36. The transmission cable 34 and the UHF antenna unit 36 constitute elements of the package-type assembly with which the bracket support of the present invention is associated.

The bow-tie antenna unit 36 is conventional and constitutes no part of the present invention except insofar as the manner in which it is operatively mounted on the rear panel 16 of the television receiver 10 is concerned. Bow-tie antenna units are well known and they are extremely effective for receiving UHF signals. The antenna unit 36 is essentially a miniature half-wave dipole which is carried on a Bakelite or other dielectric support such as has been shown at 38, the latter being supported on the upper end of an antenna mast or post 40. Bow-tie antennas possess poor antenna directivity as is the case with practically all horizontal dipole-type antenna arrangements and, therefore, it is essential that means be provided for rotating the dipole arrangements in order to accommodate UHF signals coming from different directions. It is also desirable to be able to vary the elevation of a bow-tie antenna unit, especially an indoor antenna unit in order to accommodate different positions of the associated receiver and either to avoid or to encounter various reflection fields which may be present in the vicinity of any given installation. The maximum effective position of any given indoor bow-tie antenna unit is usually based upon empirical considerations where the best television picture results are obtained by a trial-and-error adjustment of the bow-tie unit.

According to the present invention, the bow-tie antenna unit 36 is supported upon a vertical antenna mast as previously indicated and this mast 40 is vertically slidable and rotatable in a pair of vertically spaced, axially aligned, friction rings 42. The latter are carried at the ends of a C-shaped length 43 of rod stock and are supported in respective circular loops 44. Such loops are formed at the ends of the parallel horizontal arms 46 of the length 43 of rod stock, while the vertical bight portion 48 of the rod stock length 43 is welded to a pair of parallel, horizontally extending, vertically spaced rods 50. The rods 50, in turn, are welded adjacent their ends to the vertical side sections 52 of a flat pentagonal frame or loop 53 of rod stock, the loop further including a horizontal top section 54 which extends between and is connected to the upper ends of the vertical side sections 52, and a V-shaped bottom section 55, which extends between, and is connected to, the lower ends of said side sections 52.

Two vertically extending, laterally spaced, downwardly and forwardly directed hook members 56 are welded to the rods 50 within the pentagonal confines of the loop 53 and are formed at their upper ends with hooks proper 58 above the level of the uppermost rod 50. A pendant helical tension spring 60 is loosely supported on the V-shaped bottom section 55 of the rod stock loop 53 and includes a body portion 62, an upper loop portion 64 in encircling relation with the central portion of the bottom section 55, and an upwardly and forwardly directed hook portion 66.

The two vertically spaced friction rings 42 are preferably formed of suitable elastomeric, plastic or similar material which, although somewhat resilient, possesses an appreciable degree of resistance to compressional forces to the end that the rings are caused closely to hug the exterior cylindrical surface of the antenna mast 40 and support the mast in any selected position of elevation, while at the same time allowing the mast to be rotated in such a manner as to give a desired directional characteristic to the bow-tie antenna unit 36. To facilitate both elevational and rotational adjustment of the antenna unit, a socketed sheath or handle 70 is telescopically received over the lower end of the mast 40. To lend centripetal gripping resilience to the rings 42, these rings may be radially grooved as indicated at 72.

In the application of the package-type assembly of the bow-tie antenna unit 36, its associated mast 40 and the bracket support of the present invention to the perforated hardboard rear panel 16 of the television receiver 10, the two hooks proper 58 are inserted through two horizontally aligned holes 18 in said rear panel, preferably in the upper regions of the panel, and thereafter, the spring 60 is extended and the hook portion 66 thereof is inserted through a selected hole in the lower region of the panel, preferably a hole which lies in a vertical plane that bisects the vertical planes of the two holes that are selected for reception of the hooks proper 58. The flat frame or loop 53 will then lie flush with or closely against the rear panel 16. If no such accurately centered hole can be found in the perforated hardboard rear panel 16, a slight offset of the hook 66 will not destroy the vertical orientation of the antenna mast 40 because the position of the two rigid hooks 58 in their respective horizontally aligned holes 18 is controlling of the position of the bracket support, as a whole, the spring 60 being, in a sense, pivoted for slight angular displacements from the vertical without destroying the position of the loop 53 or placing the same under undue tension.

In the event that the television receiver to which the bow-tie antenna unit 36 is to be applied is not equipped with a perforated hardboard rear panel, the hooks 58 may be hooked over the lower horizontal edge of any elongated slot, such as one of the air vent slots 20, or any exposure slot which may be present. The spring hook 66 may then be hooked under the extreme lower edge of the rear panel itself or under the lower rear edge of the television receiver cabinet. If no anchor points can be found for the hooks 58 or the hook 66, then it is a comparatively simple operation for the owner of the television receiver to drill or punch suitable holes through the rear panel for reception therethrough of these hooks.

After a given installation has been effected in the manner indicated above, antenna adjustment for elevation and direction may be made by proper manipulation of the handle 70.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. A bracket support by means of which a television antenna mast may be supported in a vertical position from the rear panel of a television receiver, said bracket support comprising a closed loop of rod stock, upper and lower spaced apart horizontally extending rods extending across said loop and having their ends welded thereto, a vertically extending rod extending between said horizontally extending rods and welded thereto, the upper end of said vertically extending rod being formed with a forwardly extending downwardly facing hook thereon adapted for projection through an opening in said rear panel, a tension spring having its upper end secured to the lower end region of said loop and provided at its lower end with an upwardly facing hook adapted, after elongation of the spring, for projection through a second opening in said rear panel whereby the intervening portions of the panel between said openings will be clamped between said hooks and the loop supported in a vertical plane from the panel, a C-shaped support formed from a length of rod stock, having its bight portion extending vertically and welded to said horizontally extending rods, and presenting rearwardly extending parallel arms, the distal ends of said arms being formed with circular loops, a friction ring secured within each circular loop, the two friction rings being coaxial for projection of the mast therethrough with a sliding fit, said friction rings being adapted to exert a centripetal gripping force on said mast of sufficient magnitude that the mast is self-supporting in any position of elevation thereof but of insufficient magnitude to prevent manipulation of the mast.

2. A bracket support as set forth in claim 1 and wherein the upper end of said tension spring is provided with an attachment loop at its upper end by means of which it is slidably secured to the lower region of said loop.

3. A bracket support by means of which a television antenna mast may be supported in a vertical position from the rear panel of a television receiver, said bracket support comprising a closed loop of rod stock, upper and lower spaced apart horizontally extending rods extending across said loop and having their ends welded thereto, a pair of horizontally spaced vertically extending rods bridging the distance between said horizontally extending rods and welded thereto, the upper ends of said vertically extending rods being formed with forwardly extending downwardly facing hooks thereon adapted for projection through a pair of openings in said rear panel, a tension spring having its upper end secured to the lower end region of said loop and provided at its lower end with an upwardly facing hook adapted, after elongation of the spring, for projection through a third opening in said rear panel whereby the intervening portions of the panel between said openings will be clamped between said hooks and the loop supported in a vertical plane from the panel, a C-shaped support formed from a length of rod stock, having its bight portion extending vertically and welded to said horizontally extending rods, and presenting rearwardly extending parallel arms, the distal ends of said arms being formed with circular loops, a friction ring secured within each circular loop, the two friction rings being coaxial for projection of the mast therethrough with a sliding fit, said friction rings being adapted to exert a centripetal gripping force on said mast of sufficient magnitude that the mast is self-supporting in any position of elevation thereof but of insufficient magnitude to prevent manipulation of the mast.

References Cited by the Examiner

UNITED STATES PATENTS

| | | | |
|---|---|---|---|
| 1,096,869 | 5/1914 | Thorpe | 248—43 |
| 2,681,195 | 6/1954 | Bradt et al. | 248—43 |
| 2,842,264 | 7/1958 | Larson | 206—65 |
| 2,846,174 | 8/1958 | Sewell | 248—302 X |
| 2,996,192 | 8/1961 | Dell et al. | 211—49 |
| 3,071,338 | 1/1963 | Kaufman et al. | 248—43 |

CLAUDE A. LE ROY, *Primary Examiner.*